(No Model.)

A. H. RICHARDSON.
MACHINE FOR SHARPENING CUTTING TOOLS.

No. 424,025. Patented Mar. 25, 1890.

Witnesses,
Geo. H. Strong
J. B. Nurse

Inventor,
Albert H. Richardson
By Dewey & Co.
Attys

UNITED STATES PATENT OFFICE.

ALBERT H. RICHARDSON, OF SAN FRANCISCO, CALIFORNIA.

MACHINE FOR SHARPENING CUTTING-TOOLS.

SPECIFICATION forming part of Letters Patent No. 424,025, dated March 25, 1890.

Application filed August 14, 1889. Serial No. 320,744. (No model.)

*To all whom it may concern:*

Be it known that I, ALBERT H. RICHARDSON, of the city and county of San Francisco, State of California, have invented an Improvement in Machines for Sharpening Serrated and Irregular Cutting-Tools; and I hereby declare the following to be a full, clear, and exact description of the same.

My invention relates to a machine which is designed to sharpen files, saws, and all that class of tools which have irregular cutting-edges, such as cannot ordinarily be sharpened except by the use of a file or similar tool; and my invention consists in the construction and arrangement of devices, which I shall hereinafter fully describe and claim.

Figure 1:
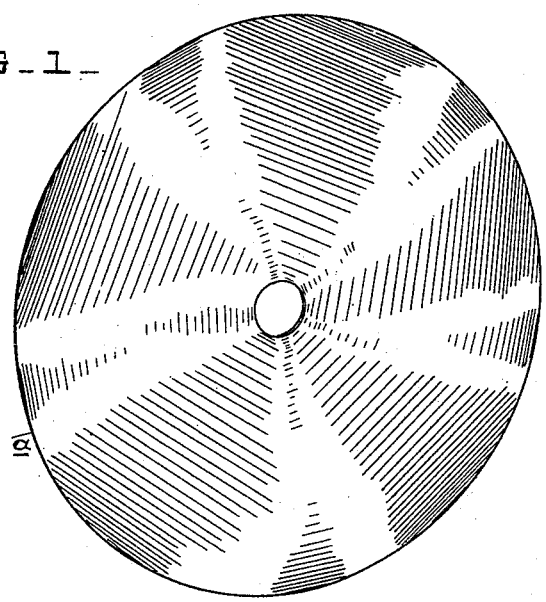
Figure 3:
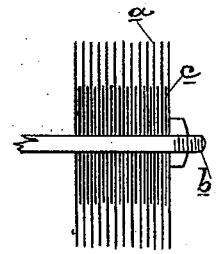
Figure 2:
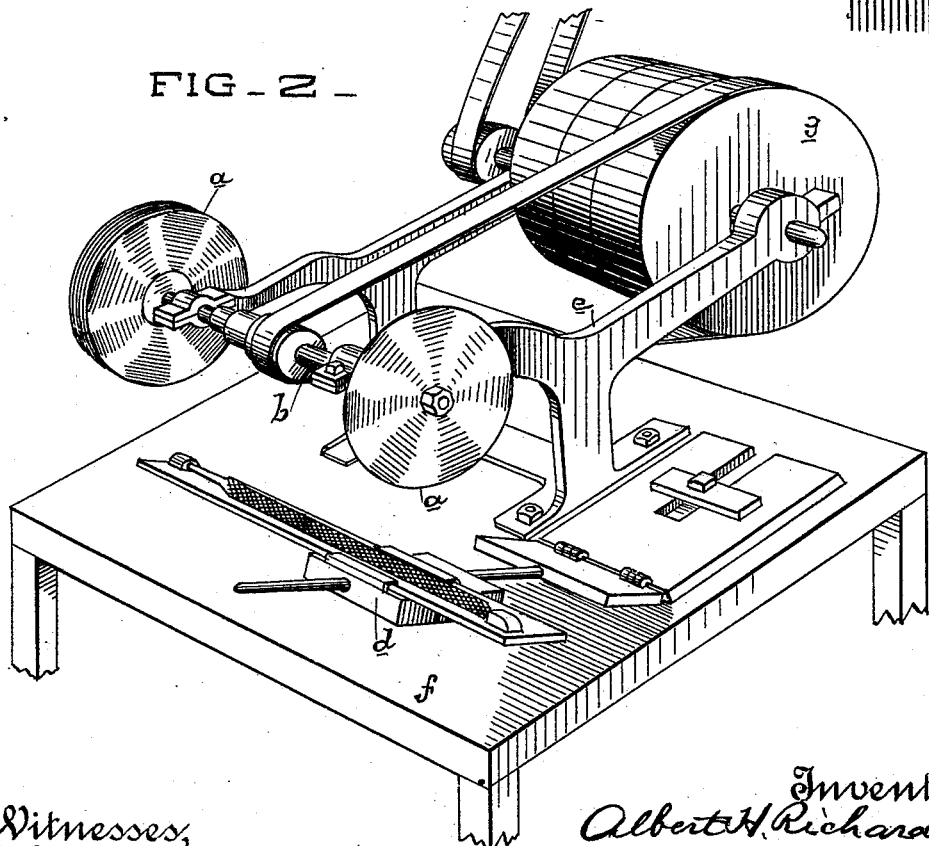

Referring to the accompanying drawings for a more complete explanation of my invention, Figure 1 is a view of one of the disks. Fig. 2 is a view showing the disks mounted on an arbor in position for work. Fig. 3 is an edge view of the disks.

In the construction of my sharpening-tool I take thin disks of paper, pasteboard, wood pulp, fiber, or other similar easily-cut material $a$, and coat one or both surfaces with a preparation of corundum, emery, or other fine hard dust or powder, which is mixed with a proper cement, which will bind and hold it firmly to the surface of the disk. These disks are made of any desirable thickness, depending on the size of the teeth to be cut. When very fine files are to be sharpened, it will be manifest that the disks will be made of very thin paper, and they may be mounted upon a spindle or arbor $b$, with alternate cutting-disks $a$ and plain disks $c$ of smaller diameter, which will separate the cutting-disks a distance equal to the spaces between the teeth. If the teeth to be sharpened are those of a saw, it will be manifest that the disks will be made thicker and may be separated to a greater distance from each other. A similar arrangement of disks may be used to sharpen irregularly-edged tools, such as are employed in wood-working to cut molding and irregular forms, and which cannot be sharpened upon a plain grindstone or emery-wheel.

The operation of my disks is very simple, the cutting being done by the hard powder which forms the surface of the disks, and which is sufficiently hard to cut a file or any tool of steel without drawing the temper. The paper or soft material which forms the basis of the disks will wear away gradually, so as to keep a perfect edge upon the emery-disks until they are entirely worn away, the paper serving simply to support a coating of emery which would be too thin to sustain itself and do the work required.

When files or straight saws are to be sharpened they are supported upon a carriage $d$, which is adapted to travel upon the table of the machine, and may be so adjusted as to hold the file or other article so that when mounted beneath the edges of the revolving disks the teeth will be carried across these edges and cut away or sharpened by them.

It will be manifest that the disks may be mounted in gangs upon the spindle or arbor, so as to cut as many teeth upon the surface of the file as can be found in a straight line, this depending upon the shape and curvature of the surface of the file or other tool.

The disks may be driven in any suitable way. In the present case I have shown the arbor to which they are secured journaled in a frame $c$ upon the table $f$ and having a small pulley and a counter-shaft with larger pulleys $g$, from which a belt passes to a smaller pulley, the speed being thus multiplied to any desired degree.

Having thus described my invention, what I claim as new, and desire to secure by Letters Patent, is—

The device herein described for grinding or sharpening files and serrated cutting-tools, consisting of a series of disks having both surfaces coated with abrading material, intervening disks of smaller diameter for separating the abrading-disk, a distance equal to the distance between the teeth to be sharpened, and a spindle or arbor for said disks, substantially as described.

In witness whereof I have hereunto set my hand.

ALBERT H. RICHARDSON.

Witnesses:
S. H. NOURSE,
H. C. LEE.